US007108433B2

(12) United States Patent
Preszler et al.

(10) Patent No.: US 7,108,433 B2

(45) Date of Patent: Sep. 19, 2006

(54) THERMAL PROCESSOR EMPLOYING VARYING ROLLER SPACING

(75) Inventors: Duane A. Preszler, River Falls, WI (US); Brian L. Johnson, Woodbury, MN (US)

(73) Assignee: Eastman Kodak Company, Rochester, NY (US)

( * ) Notice: Subject to any disclaimer, the term of this patent is extended or adjusted under 35 U.S.C. 154(b) by 171 days.

(21) Appl. No.: 10/876,148

(22) Filed: Jun. 24, 2004

(65) Prior Publication Data

US 2005/0285923 A1 Dec. 29, 2005

(51) Int. Cl.
*G03B 13/00* (2006.01)

(52) U.S. Cl. ........................................ 396/575; 355/27

(58) Field of Classification Search ..................... None
See application file for complete search history.

(56) References Cited

U.S. PATENT DOCUMENTS

| | | | |
|---|---|---|---|
| 3,534,673 | A | 10/1970 | Miller et al. |
| 3,557,469 | A | 1/1971 | Edgington |
| 3,807,616 | A | 4/1974 | Hope et al. |
| 3,914,097 | A | 10/1975 | Wurl |
| 4,079,635 | A | 3/1978 | Hope et al. |
| 4,358,194 | A | 11/1982 | Krehbiel |
| 4,739,358 | A | 4/1988 | Takahashi et al. |
| 5,414,488 | A | 5/1995 | Fujita et al. |
| 5,420,659 | A | 5/1995 | Manico et al. |
| 5,869,806 | A | 2/1999 | Struble et al. |
| 5,869,860 | A | 2/1999 | Widmann et al. |
| 5,895,592 | A | 4/1999 | Struble et al. |
| 6,007,971 | A | 12/1999 | Star et al. |
| 6,285,006 | B1 | 9/2001 | Hyllberg |
| 6,285,386 | B1 | 9/2001 | Suzuki |
| 6,340,444 | B1 | 1/2002 | Hashiguchi |
| 6,392,209 | B1 | 5/2002 | Oppitz |
| 6,499,893 | B1 | 12/2002 | Harada et al. |
| 6,611,315 | B1 | 8/2003 | Hashiguchi |
| 2003/0025776 | A1 | 2/2003 | Sumi et al. |

FOREIGN PATENT DOCUMENTS

| | | |
|---|---|---|
| JP | 2003-47379 | 6/1999 |
| JP | 2001-330922 | 11/2001 |

*Primary Examiner*—D. Rutledge
(74) *Attorney, Agent, or Firm*—Susan L. Parulski

(57) ABSTRACT

A thermal processor for thermally developing an image in an imaging material. The thermal processor includes an oven and a plurality of rollers positioned to form a transport path and, through contact with the imaging material, configured to move the imaging material through the oven along the transport path. Each roller has an initial contact point and a final contact point with the imaging material as the imaging material moves along the transport path. A spacing between the rollers is varied such that a distance between a final contact point and an initial contact point of at least a first pair of rollers along the transport path is different from a distance between a final contact point and an initial contact point of at least a second pair of consecutive rollers along the transport path.

29 Claims, 4 Drawing Sheets

THERMAL PROCESSOR EMPLOYING VARYING ROLLER SPACING

FIELD OF THE INVENTION

The present invention relates generally to an apparatus and method for processing an imaging material, and more specifically an apparatus and method for thermally developing an imaging material employing varying spacing between rollers forming a transport path.

BACKGROUND OF THE INVENTION

Photothermographic film generally includes a base material coated on at least one side with an emulsion of heat sensitive materials. Once the film has been subjected to photo-stimulation by optical means (e.g., laser light), or "imaged", the resulting latent image is developed through the application of heat to the film. In general, the uniformity in the density of a developed image is affected by the manner in which heat is transferred to the emulsion of heat sensitive material. During the developing process, uneven contact between the film and supporting structures can result in non-uniform heating of the film which, in-turn, can result in an uneven image density and other visual artifacts in the developed image. Therefore, the uniform transfer of heat to the heat sensitive materials during the developing process is critical in producing a high quality image.

Several types of thermal processing machines have been developed in efforts to achieve optimal heat transfer to sheets of photothermographic film during processing. One type of thermal processor, commonly referred to as a "flat bed" thermal processor, generally comprises an oven enclosure within which a number of evenly spaced rollers are configured so as to form a generally horizontal transport path through the oven. Some type of drive system is employed to cause the rollers to rotate, such that contact between the rollers and a piece of imaged film moves the film through the oven along the transport path from an oven entrance to an oven exit. As the film moves through the oven, it is heated to a required temperature for a required time period necessary to optimally develop the image.

While flat-bed type thermal processors are effective at developing photothermographic film, variations in image density can occur as the film moves through the oven. For instance, as a piece of film is transferred from one roller to the next, the lead edge can butt or "stub" into the next roller along the transport path until it eventually rides over the roller and is moved on to the next downstream roller. When the film stubs into a downstream roller, the force, although small, can be sufficient to cause a change in the velocity of the film as it moves along the transport path. Depending on the films rigidity, this velocity change may cause the film to either lift off from or to remain too long in contact with the surface of preceding rollers along the transport path and cause those areas of the film proximate to the roller surfaces to be heated differently than adjacent areas. A less rigid film may lift off from the roller surface and result in less heating to such areas than adjacent areas, while a more rigid film may remain for longer than a desired time on the roller surface and result in more heating to such areas than adjacent areas. In another instance, as the film moves along the transport path, the trailing edge may not maintain a desired contact with the roller surfaces and also in uneven heat transfer to the trailing edge.

Such non-uniform heating can produce variations in image density in the developed image which appear in the form of visible bands across the film. This effect is commonly referred to as "cross-width" or "cross-web" banding. Too much heating can result in "dark" bands, while too little heating may result in "light" bands. Furthermore, because the rollers are evenly spaced, the banding effect is reinforced at the same locations on the film as it moves from roller to roller along the transport path, and thus becomes increasingly visible as the film is processed.

Such cross-web banding is of particular concern in thermal processors employing heated rollers, such as that described by U.S. patent application Ser. No. 10/873,816 entitled "Flat Bed Thermal Processor Employing Heated Rollers", (Kodak Docket No. 87968/SLP) filed on Jun. 22, 2004, assigned to the same assignee as the present application, and herein incorporated by reference. It is also more of a concern with rollers forming an initial portion of the transport path, as the difference in heat transfer to the film caused by its being lifted from or stalling on the roller surfaces is lessened as the film nears a desired developing temperature along the latter portions of the transport path.

It is evident that there is a continuing need for improved photothermographic film developers. In particular, there is a need for a flat bed type thermal processor having a roller system that substantially eliminates the above described cross-web banding effect.

SUMMARY OF THE INVENTION

In one embodiment, the present invention provides a thermal processor for thermally developing an image in an imaging material. The thermal processor includes an oven and a plurality of rollers positioned to form a transport path and, through contact with the imaging material, configured to move the imaging material through the oven along the transport path. Each roller has an initial contact point and a final contact point with the imaging material as the imaging material moves along the transport path. A spacing between the rollers is varied such that a distance between a final contact point and an initial contact point of at least a first pair of rollers along the transport path is different from a distance between a final contact point and an initial contact point of at least a second pair of consecutive rollers along the transport path.

By varying the spacing between consecutive pairs of rollers along transport path, different areas of the imaging material are in contact with upstream rollers when a leading edge of the imaging material contacts a next downstream roller. As a result, the present invention results in more uniform heat transfer to the imaging material and, thus, improved image quality, since the same area(s) of the imaging material are not repeatedly separated from or stalled on the surface of an upstream roller each time the imaging material passes from the upstream roller to a downstream roller.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
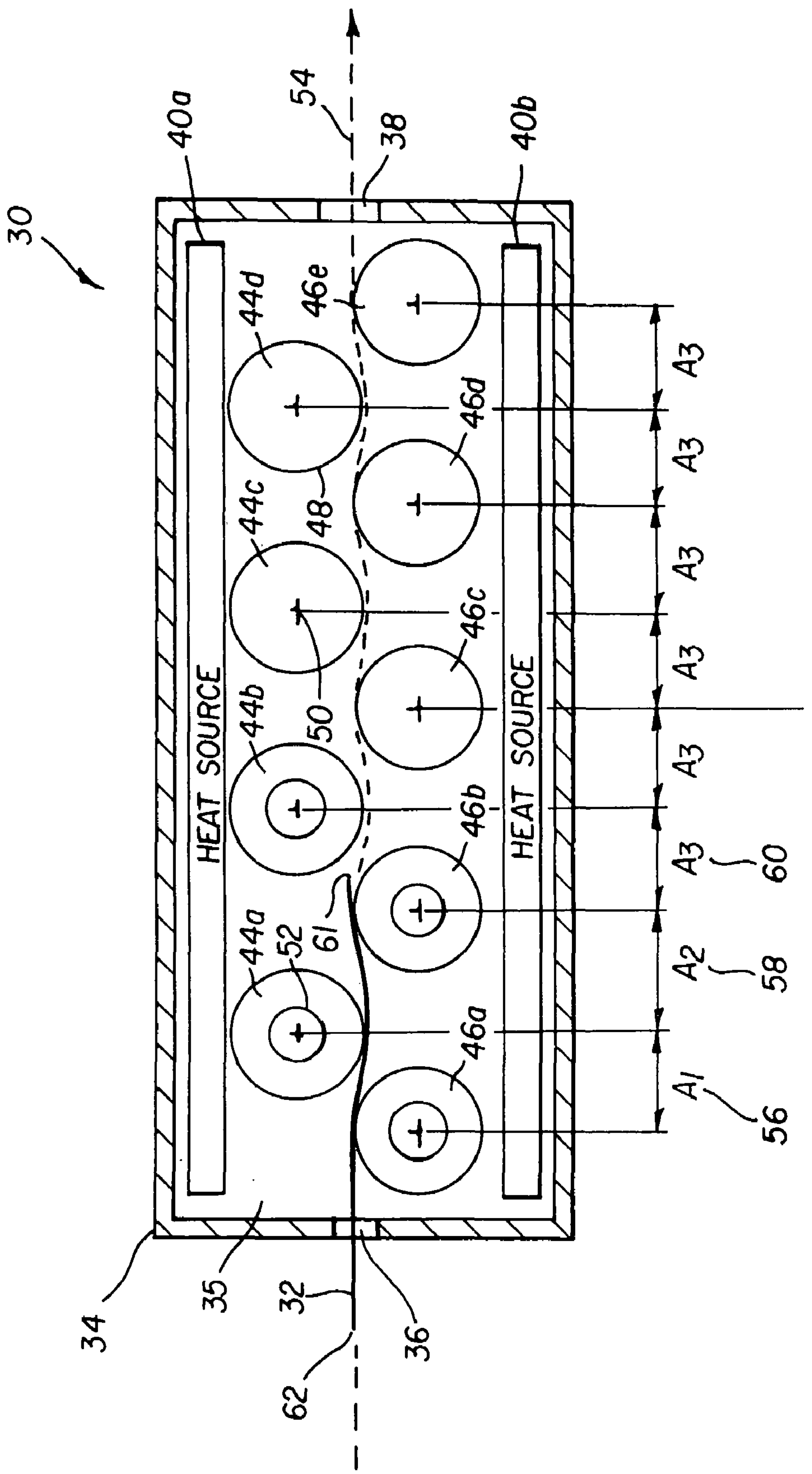
FIG. 1 is a side sectional view of one embodiment of a thermal processor according to the present invention.

The following is a detailed description of the preferred embodiments of the invention, reference being made to the drawings in which the same reference numerals identify the same elements of structure in each of the several figures.

Reference is made to U.S. patent application Ser. No. 10/815,027 entitled "Apparatus and Method For Thermally Processing An Imaging Material Employing a Preheat Chamber," filed on Mar. 31, 2004, assigned to the same assignee as the present application, and herein incorporated by reference.

Reference is made to U.S. patent application Ser. No. 10/873,816 entitled "Flat Bed Thermal Processor Employing Heated Rollers", (Kodak Docket No. 87968/SLP) filed on Jun. 22, 2004, assigned to the same assignee as the present application, and herein incorporated by reference.

FIG. 1 is a cross-sectional view illustrating one exemplary embodiment of a thermal processor 30 employing varying roller spacing according to the present invention for developing an image in an imaging material 32. Thermal processor 30 includes an enclosure 34 that forms an oven 35 having an entrance 36 and an exit 38. An oven heater 40, illustrated as an upper heat source 40*a* and a lower heat source 40*b*, is configured to maintain oven 35 at substantially a desired temperature for development of the imaging material.

An upper group of rollers 44 and a lower group of roller 46, each having a cylindrical surface 48 and a rotational axis 50, are rotatably mounted to opposite sides of enclosure 34. In one embodiment, a portion of upper rollers 44 and lower rollers 46 include internal heating elements 52, as described by previously incorporated U.S. patent application Ser. No. 10/873,816 entitled "Flat Bed Thermal Processor Employing Heated Rollers", (Kodak Docket No. 87968/SLP) filed on Jun. 22, 2004. The rollers 44 of the upper group and the rollers 46 of the lower group are staggered horizontally from one another and are vertically offset so as to overlap a horizontal plane, such that rollers 44 from the upper group and rollers 46 from the lower group alternate to form a sinusoidal-like transport path 54 through oven 35. One or more of the rollers 44 and 46 can be driven such that contact between the cylindrical surfaces 48 of rollers 44 and 46 moves imaging material 32 along transport path 54. A thermal processor having a similar roller configuration is described by U.S. Pat. No. 5,869,860 (Struble et. al.), which is herein incorporated by reference.

Rollers 44 and 46 are horizontally spaced such that a horizontal distance (A1) 56 between the rotational axes 50 of the pair consecutive rollers 46*a* and 44*a* is different from a horizontal distance (A2) 58 between the rotational axes 50 of the next pair of consecutive rollers 44*a* and 46*b*. Similarly, a horizontal distance (A3) 60 between the next pair of consecutive roller 46*b* and 44*b* is different from both A1 56 and A2 58. Thereafter, the horizontal distances between the rotational axes of each of the remaining consecutive pairs of rollers 44 and 46 along transport path 54 are substantially equal to A3 60. In one embodiment, distance A1 56 is less than distance A2 58, and distance A3 60 is less than distance A2 58 but greater than distance A1 56. In one embodiment, the horizontal distance between rotational axes of any given pair of consecutive rollers is different from the horizontal distance between rotational axes of any other given pair of consecutive rollers. As will be more fully illustrated by FIG. 2 below, varying the distance between the rotational axes pairs of consecutive rollers results in varying a distance between a last point of contact with the surface of the first roller and an initial point of contact with the surface of the next roller.

Imaging material 32 enters oven 35 at entrance 36 at an ambient temperature. As imaging material 32 moves along transport path 54, imaging material 32 is initially heated by upper and lower heat sources 40*a* and 40*b*, and by internally heated rollers 46*a*, 44*a*, 46*b*, and 44*b*, with the greatest amount of thermal energy transferred to imaging material 32 being provided by internally heated rollers 46*a*, 44*a*, 46*b*, and 44*b*. Since the temperature difference between imaging material 32 and oven 35 decreases as imaging material 32 moves through oven 35, the majority of thermal energy transfer to imaging material 32, and thus the greatest rate of temperature increase of imaging material 32, occurs during this initial period. As imaging material 32 nears the desired temperature, the amount of heat transferred to imaging material 32 is substantially reduced. As such, non-internally heated rollers 46*c*, 44*c*, 46*d*, 44*d*, and 46*e* essentially move imaging material 32 the remaining distance along transport path 54 to exit 38, while upper and lower heat sources 40*a* and 40*b* maintain the non-internally heated rollers 46*c*, 44*c*, 46*d*, 44*d*, and 46*e*, and imaging material 32 at the desired temperature.

While the heating of imaging material 32 is described above with respect to an initial portion of the rollers including an internal heating element, transfer of thermal energy to the imaging material would be similar even if none of the rollers included internal heating elements. In such an instance, as illustrated below by FIG. 4, the majority of heat transfer to the imaging material would still occur in the initial portions of oven 35 with the greatest amount of thermal energy still being transferred to the imaging material by the initial rollers along transport path 54, even though not internally heated.

As imaging material 32 moves along transport path 54, imaging material 32 is successively transferred from an upstream roller to a downstream roller. When imaging material 32 is transferred from the upstream roller to the downstream, from roller 44*b* to roller 46*c* for example, a leading edge 61 of imaging material 32 may "stub" into downstream roller 46*c* before traveling over the cylindrical surface 48 of downstream roller 46*c* and continuing on to the next roller 44*c*. When leading edge 61 stubs into downstream roller 46*c*, the impact can cause a change in the velocity of imaging material 32 as it moves along transport path 54. Depending on the rigidity of imaging material 32, the velocity change may cause imaging material 32 to lift from or to stay too long in contact with upstream roller 44*b*, potentially resulting in an "uneven" heat transfer to imaging material 32. Additionally, as a trailing edge 62 of imaging material 32 is transferred from an upstream roller to a downstream roller, it may not maintain a desired contact with the upstream roller and thus, may also result in uneven heat transfer to trailing edge 62. Such incidences of uneven heat transfer can occur each time imaging material 32 passes from one roller to the next along transport path 54.

By varying the horizontal distances between the rotational axes of consecutive pairs of rollers along transport path 54, particularly along the initial portions of transport path 54 where the largest amount of thermal energy transfer to imaging material 32 occurs, thermal processor 30 according to the present invention, reduces cross-web banding effects by causing different areas of imaging material 32 to be in contact with an upstream roller, such as roller **46*b*, when leading edge 61 "stubs into" a next downstream roller, such as roller 44*b*. Varying the horizontal distances between the rotational axes of rollers in this fashion results in more uniform heat transfer to imaging material 32 and, thus, improved image quality, since the same area(s) of imaging material 32** are not repeatedly in contact with the surface of an upstream roller each time the imaging material passes from the upstream roller to a downstream roller.

Figure 2A:
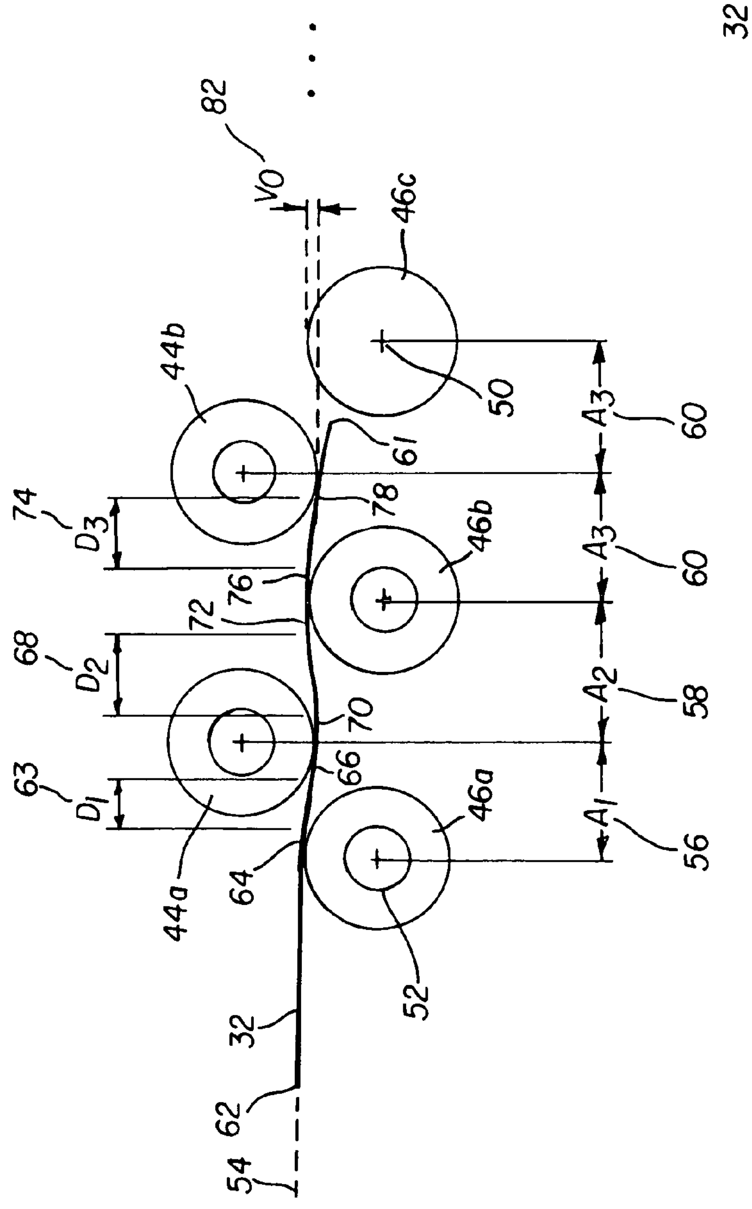
FIG. 2A is an expanded view of one embodiment of the thermal processor shown in FIG. 1.
Figure 2B:
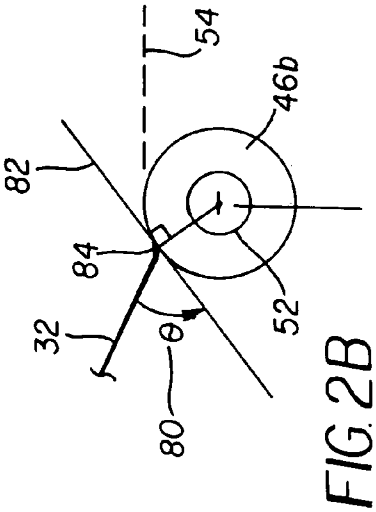
FIG. 2B is an expanded view of one embodiment of the thermal processor shown in FIG. 1.

FIG. 2A is an expanded view of a portion of thermal processor 30 of FIG. 1. The rotational axes 50 of the initial pair of rollers of transport path 54, rollers **46*a* and 44*a*, are spaced at a distance A1 56. The rotational axes of the second pair of rollers of transport path 54, rollers 44*a* and 46*b*, are spaced at a distance A2 58. The rotational axes 50 of the third pair of rollers of transport path 54, rollers 46*b* and 44*b*, and each pair of consecutive rollers thereafter, are spaced at a distance A3 60. As imaging material 32 moves along transport path 54 from an upstream roller to a downstream roller, imaging material 32 makes a point of final contact with the surface of the upstream roller and a point of initial contact with the surface of the downstream roller, with the distance between these contact points being dependent upon the distance between the rotational axes of the rollers. As such, a distance D1 63 separates a point of final contact 64 of imaging material 32 with roller 46*a* from a point of initial contact 66 with roller 44*a*, a distance D2 68 separates a point of final contact 70 of imaging material 32 with roller 44*a* from a point of initial contact 72 with roller 46*b*, and a distance D3 74 separates a point of final contact 76 of imaging material 32 with roller 46*b* from a point of initial contact 78 with roller 44*b*** and also the point of final and initial contact between each pair of consecutive rollers thereafter.

As described in U.S. Pat. No. 5,869,860 (Struble et al.), bending imaging material 32 through use of a sinusoidal-like transport path 54 increases the "stiffness" of imaging material 32 and reduces the occurrence of thermally-induced wrinkles and resulting variations in image density of developed imaging material 32. In order to maximize the reduction of such wrinkles, an initial bend should be introduced to imaging material 32 as soon as possible after it enters oven 35 at entrance 36. With this in mind, the closer roller **44*a* is positioned to initial roller 46*a*, and thus the smaller distances A1 58 and D1 63 are made, the sooner the initial bend will be introduced to imaging material 32**.

However, if second roller **44*a* is positioned too close to initial roller 46*a*, a bend having an undesirable "stub angle" may be created in imaging material 32 relative to third roller 46*b*. A stub angle (θ) is illustrated at 80 in FIG. 2B, and is herein defined as an angle between imaging material 32 and a line 82 tangent to the point of first contact 84 between lead edge 61 of imaging material 32 and a downstream roller, such as roller 46*b*. As such, the closer second roller 44*a* is positioned to first roller 46*a*, the larger the stub angle (θ) 80 that will created between roller 46*b* and imaging material 32. However, the larger the stub angle, the greater the change in velocity that may occur in imaging material 32 as it moves along transport path 54 and, consequently, the greater the chance that undesirable cross-web banding effects may occur. Ultimately, second roller 44*a* may be positioned so close to first roller 46*a* that a maximum stub angle 80 may be exceeded, such that imaging material 32 will not "ride over" the next downstream roller 46*b*, but will instead "fall below" roller 46*b* and fail to be transported through oven 35 and, thus, fail to be developed. Thus, in view of the above, spacing between rollers 44 and 46 is varied along transport path 54, at least along the initial portions of transport path 54 where thermal energy transfer to imaging material 32 is greatest, so as to minimize the stub angle (θ) 80** while still maintaining variable spacing to reduce cross-web banding defects.

As such, in one embodiment, distance Al 56 between initial roller **46*a* and second roller 44*a* is based on a maximum allowable stub angle. In one embodiment, roller 44*a* is positioned relative to roller 46*a* such that distance A1 56 and associated distance D1 63 result in a stub angle 80 substantially equal to, but not in excess of the maximum allowable stub angle. In one embodiment, distance A1 56 and associated distance D1 63 are respectively less than distance A3 60 and associated distance D3 74, while distance A3 60 and associated distance D3 74 are respectively less than distance A2 58 and associated distance D2 68. In one preferred embodiment, spacing between rollers 46*a*, 44*a*, and 44*b* is adjusted such that distances A1 56, A2 58 and A3 60**, respectively, are substantially equal to 11 millimeters, 18 millimeters, and 16 millimeters.

As described above, only the horizontal distances (i.e. A1, A2, and A3) between rotational axes 50 of rollers 44 and 46 have been described as being varied in order to cause different areas of imaging material 32 to be in contact with an upstream roller when leading edge 61 contacts the next downstream rollers (the "contact areas") so as to reduce potential cross-web banding effects. However, it should be noted that variations in the "contact areas" of imaging material 32 can also be achieved by varying an amount of vertical overlap $V_O$ 82 between upper rollers 44 and lower rollers 46. Such vertical overlap may be adjusted for each roller 44, 46 along transport path 54. However, as described by the Struble et al. Patent, changes in vertical overlap $V_O$ 82 may be affected by other factors, such as the size and type of imaging material 32, and also by stub angle 80 limitations. Consequently, variations in the "contact areas" of imaging material 32 achieved by varying vertical overlap 82 may not be as great as those achieved by varying the distances between rotational axes 50 of rollers 44 and 46. Nonetheless, variations in the "contact areas" of imaging material 32 can be achieved by varying the distances between rotational axes 50 of rollers 44, 46 and/or by varying the amount of vertical overlap 82 between upper rollers 44 and lower rollers 46. Furthermore, such variations in "contact areas" may also be achieved by varying the outside diameters of rollers 44 and 46.

Figure 3:
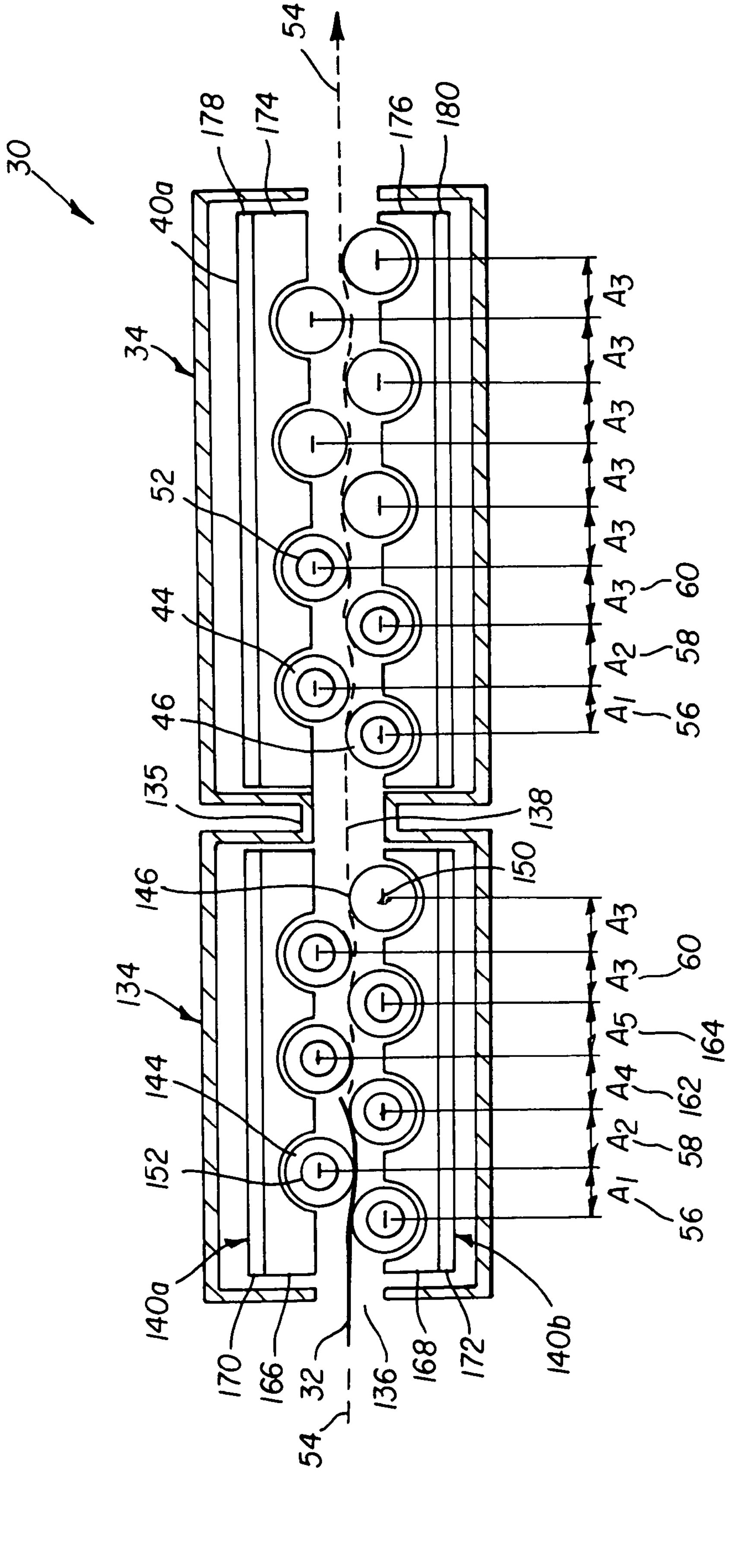
FIG. 3 is a side sectional view of another embodiment of a thermal processor according to the present invention.

FIG. 3 is a side-sectional view illustrating one exemplary embodiment of a thermal processor 30 in accordance with the present invention, wherein enclosure 34 is configured as a dwell chamber 34, and further including an enclosure 134 configured as a preheat chamber. Thermal processor 30 is configured such that preheat chamber 134 heating imaging material 32 to a first temperature and dwell chamber 34 heating imaging material 32 to a second temperature, wherein the first temperature is less than the second temperature. In one embodiment, preheat chamber 134 is thermally isolated from dwell chamber 34 via a transition section 135. In one embodiment, the second temperature comprises a developing temperature associated with imaging material 32, while the first temperature comprises a conditioning temperature below the developing temperature. A thermal processor having a similar configuration is disclosed by the previously incorporated U.S. patent application Ser. No. 10/873,816 (Kodak Docket No. 87968/SLP) filed on Jun. 22, 2004.

Preheat chamber 134 has an entrance 136 and an exit 138, and includes upper and lower heat sources, 140*a* and 140*b*, and a plurality of upper rollers 144 and lower rollers 146. In a fashion similar to that of dwell chamber 34, the plurality of upper rollers 144 and lower rollers 146 are rotatably mounted to opposite sides of preheat chamber 134 and positioned in a spaced relationship so as to contact imaging material 32 and to form a transport path 54 through preheat chamber 134 from entrance 136 to exit 138. Upper rollers 144 are horizontally offset from lower rollers 146 and vertically positioned such that upper rollers 144 and lower rollers 146 overlap a horizontal plane such that transport path 54 through preheat chamber 134 is sinusoidal-like in form. One or more of the rollers 144 and 146 can be driven such that contact between rollers 144 and 146 and imaging material 32 moves imaging material 32 through preheat chamber 134. In one embodiment, a portion of upper rollers 144 and lower rollers 146 include an internal heater 152.

Also in a fashion similar to that of dwell chamber 34, the rotational axes 150 of rollers 144 and 146 are spaced at varying distances along transport path 54. Distance A1 56 separates the rotational axes of the first pair of consecutive rollers, distance A2 58 separates the second pair of consecutive rollers, a distance A4 162 separates the third pair of consecutive rollers, a distance A5 164 separates a fourth pair of consecutive rollers, and distance A3 60 separates the remaining pairs of consecutive rollers.

Upper and lower heat sources 140*a* and 140*b* of preheat chamber 134 respectively include heat plates 166 and 168 and blanket heaters 170 and 172, and upper and lower heat sources 40*a* and 40*b* of dwell chamber 34 respectively include heat plates 174 and 176 and blanket heaters 178 and 180. Blanket heaters 170, 172, 178 and 180 can be configured with multiple zones, with the temperature of each zone being individually controlled. In one embodiment, as illustrated, heat plates 166, 168, 174, and 176 are shaped so as to partially wrap around a circumference of rollers 44, 46, 144, and 146 such that the rollers are "nested" within their associated heat plate, which more evenly maintains the temperature of the rollers.

As imaging material 32 moves through preheat chamber 134, upper and lower heat sources 140*a* and 140*b* and rollers 144, and 146 having internal heaters 152, heat imaging material 32 from an ambient temperature to substantially the first temperature. As imaging material 32 moves through dwell chamber 34, upper and lower heat sources 40*a* and 40*b* and rollers 44, and 46 having internal heaters 52, heat imaging material 32 from substantially the first temperature to substantially the second temperature. By varying the spacing between rollers of preheat chamber 134 and dwell chamber 34, particularly where the greatest amount of thermal energy is transferred to imaging material (i.e. those portions of transport path 54 formed by rollers having internal heaters 52, 152), thermal processor 30 as illustrated by FIG. 3 reduces the likelihood of the occurrence of cross-web banding associated with lead edge 61 "stubbing into" a downstream roller as imaging material 32 passes from an upstream to a downstream roller along transport path 54.

While rollers 144 and 146 of preheat chamber 134 are described as being variably spaced along transport path, varying of the spacing between rollers of preheat chamber 134 is not as critical as varying the spacing between the rollers of dwell chamber 34 since the temperature of preheat chamber 134 is less than a development temperature of imaging material 32 and thus, substantially no development takes place in preheat chamber 134. As such, in one embodiment, rollers 144 and 146 can be evenly spaced along transport path 54 such that distances A1, A2, A3, A4, and A5 are substantially equal distances.

Figure 4:
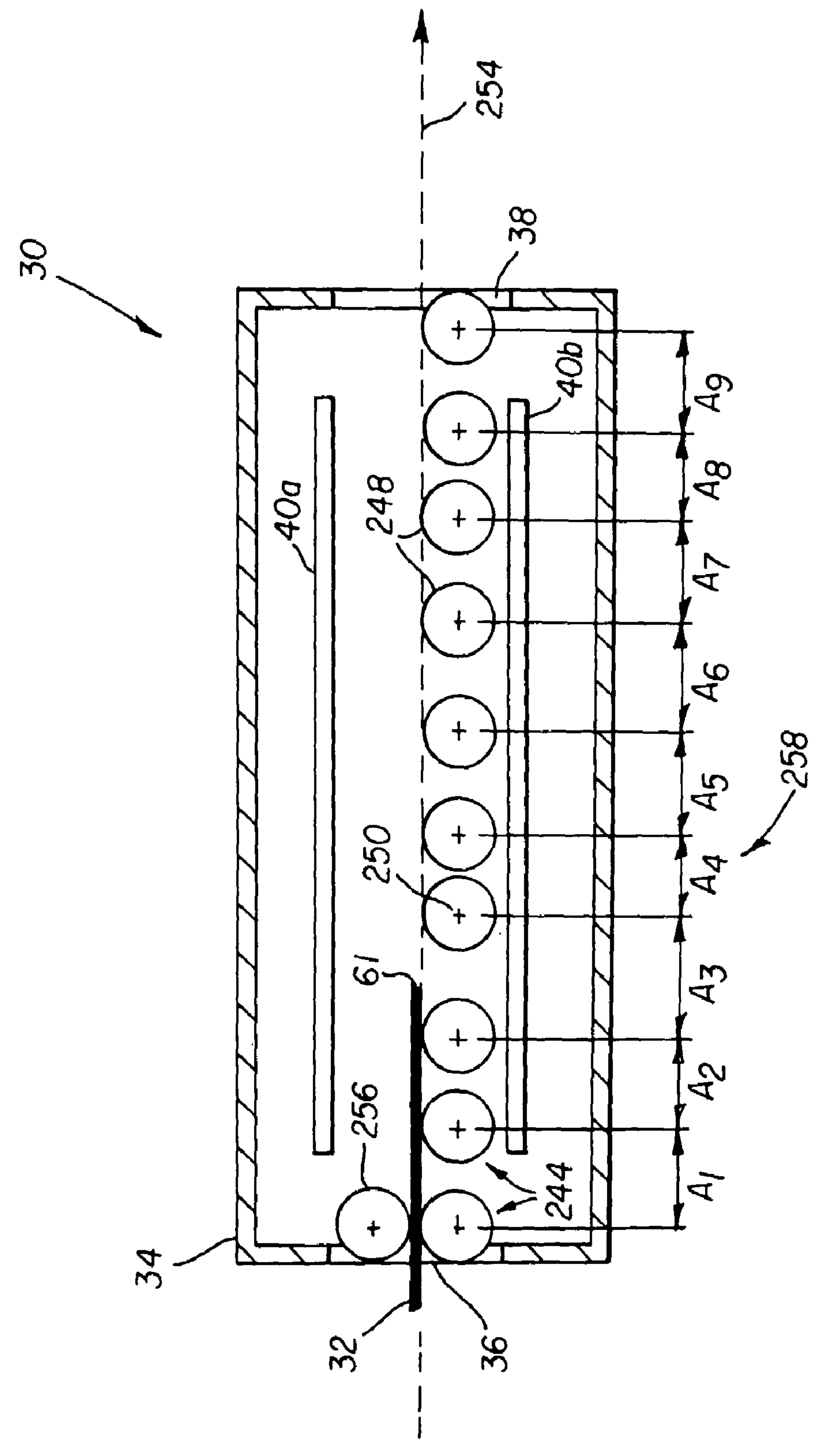
FIG. 4 is a side sectional view of another embodiment of a thermal processor according to the present invention.

FIG. 4 is a side-sectional view illustrating one exemplary embodiment of a thermal processor 30 employing varying roller spacing according to the present invention for developing an image in an imaging material 32. Thermal processor 30 includes an enclosure 34 that forms an oven 35 having an entrance 36 and an exit 38, and upper and lower heat sources 40*a* and 40*b* configured to maintain oven 35 at substantially a desired temperature.

A plurality of generally parallel rollers 244 (ten are shown), each having a cylindrical surface 248 and a rotational axis 250, are rotatably mounted to opposite sides of enclosure 34. Rollers 244 are spaced such that cylindrical surfaces 248 form a generally horizontal transport path 254 through oven 35 from entrance 36 to exit 38. A roller 256 forms a nip with a first roller of the plurality 244 at oven entrance 36. One or more of the rollers 244, 256 can be driven such that cylindrical surfaces 248 frictionally engage imaging material 32 to move imaging material 32 through oven 35 along transport path 254. It should be noted that, unlike the thermal processors illustrated by FIG. 1 and FIG. 3, none of the rollers 244 are heated by an internal heating element so that the only heat sources are upper and lower heat sources 40*a* and 40*b*.

Rollers 244 are horizontally spaced such that horizontal distances A1 through A9, illustrated at 258, between the rotational axes 250 any consecutive pair of rollers 244 is different from any other consecutive pairs of rollers 244. By varying the horizontal distances between the rotational axes 250 of consecutive pairs of rollers 244 forming transport path 254, thermal processor 30 according to the present invention reduces cross-web banding effects by causing different areas of imaging material 32 to be in contact with an upstream roller when leading edge 61 contacts the next downstream roller.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

| | |
|---|---|
| 30 | Thermal Processor |
| 32 | Imaging Material |
| 34 | Enclosure/Dwell Chamber |
| 35 | Oven |
| 36 | Oven Entrance |
| 38 | Oven Exit |
| 40a | Upper Heat Source |
| 40b | Lower Heat Source |
| 44a | Internally Heated Roller |

-continued

| PARTS LIST | |
|---|---|
| 44b | Internally Heated Roller |
| 44c | Non-Internally Heated Roller |
| 44d | Non-Internally Heated Roller |
| 46a | Internally Heated Roller |
| 46b | Internally Heated Roller |
| 46c | Non-Internally Heated Roller |
| 46d | Non-Internally Heated Roller |
| 46e | Non-Internally Heated Roller |
| 48 | Roller/Cylindrical Outer Surface |
| 50 | Rotational Axes |
| 52 | Internal Heating Element |
| 54 | Transport Path |
| 56 | Horizontal Distance (A1) |
| 58 | Distance (A2) |
| 60 | Horizontal Distance (A3) |
| 61 | Imaging Material Leading Edge |
| 62 | Imaging Material Trailing Edge |
| 63 | Distance (D1) |
| 66/72/78 | Initial Contact Point Between Imaging Material and Roller |
| 64/70/76 | Final Contact Point Between Imaging Material and Roller |
| 68 | Distance (D2) |
| 74 | Distance (D3) |
| 80 | Stub Angle |
| 82 | Vertical Offset Distance |
| 84 | First Contact |
| 134 | Enclosure/Preheat Chamber |
| 135 | Transition Section |
| 136 | Preheat Chamber Entrance |
| 138 | Preheat Chamber Exit |
| 140a | Upper Heat Source |
| 140b | Lower Heat Source |
| 144 | Upper Rollers |
| 146 | Preheat Chamber Roller Outer Surface |
| 150 | Rotational Axes of Preheat Chamber Rollers |
| 152 | Heating Elements of Internally Heated Preheat Chamber Rollers |
| 162 | Distance (A4) |
| 164 | Distance (A5) |
| 166 | Preheat Chamber Upper Heat Plate |
| 168 | Preheat Chamber Lower Heat Plate |
| 170 | Preheat Chamber Upper Heat Blanket |
| 172 | Preheat Chamber Lower Heat Blanket |
| 174 | Dwell Chamber Upper Heat Plate |
| 176 | Dwell Chamber Lower Heat Plate |
| 178 | Dwell Chamber Upper Blanket Heaters |
| 180 | Dwell Chamber Lower Blanket Heaters |
| 244 | Rollers |
| 248 | Cylindrical Surfaces |
| 250 | Rotational Axis |
| 254 | Horizontal Transport Path |
| 256 | Roller |
| 258 | Horizontal Distances A1–A9 |

The invention claimed is:

1. A thermal processor for developing an image in an imaging material, the thermal processor comprising:

an oven; and a plurality of rollers positioned to form a transport path and, through contact with the imaging material, configured to move the imaging material through the oven along the transport path, each roller having an initial and a final contact point with the imaging material as the imaging material moves along the transport path, wherein a spacing between the rollers is varied such that a distance between a final contact point and an initial contact point of at least a first pair of consecutive rollers along the transport path is different from a distance between a final contact point and an initial contact point of at least a second pair of consecutive rollers along the transport path.

2. The thermal processor of claim 1, wherein a distance along the transport path between a last point of contact and a first point of contact of any consecutive pair of rollers is different from a distance along the transport path between a last point of contact and a first point of contact of any other consecutive pair of rollers.

3. The thermal processor of claim 1, wherein a distance along the transport path between a last point of contact and a first point of contact of any two consecutive rollers is based on characteristics associated with the imaging material.

4. The thermal processor of claim 1, wherein a distance along the transport path between a first contact point and a last contact point between any two rollers is different from the distance along the transport path between a first contact point and a last contact point between any other two rollers.

5. The thermal processor of claim 1, wherein each roller of the plurality of rollers has a substantially equal outer diameter.

6. The thermal processor of claim 1, wherein each roller has an outer diameter and the outer diameters of a plurality of the rollers is varied such that a distance between a final contact point and an initial contact point of at least a first pair of consecutive rollers is different from a distance between a final contact point and an initial contact point of at least a second pair of consecutive rollers.

7. The thermal processor of claim 1, wherein at least one of the rollers includes an internal heater such that the at least one roller transfers thermal energy to the imaging material as it moves along the transport path.

8. A thermal processor for developing an image in an imaging material, the thermal processor comprising:

an oven; and a plurality of rollers, each having a rotational axis, the rollers positioned to form a transport path and, through contact with the imaging material configured to move the imaging material through the oven along the transport path, wherein a spacing between the rotational axes of the rollers is varied such that a distance between the rotational axes of at least a first pair of consecutive rollers is different from a distance between the rotational axes of at least a second pair of consecutive rollers, the distances being measured along a line perpendicular to the rotational axes and generally parallel to the transport path.

9. The thermal processor of claim 8, wherein each roller of the plurality of rollers has a substantially equal outer diameter.

10. The thermal processor of claim 8, wherein the distance between the rotational axes of any two consecutive rollers is different from the distance of the rotational axes of any other two consecutive rollers.

11. The thermal processor of claim 8, wherein a distance between the rotational axes of any two rollers is different from a distance between the rotational axes of any other two rollers.

12. A flatbed thermal processor for developing an image in an imaging material, the processor comprising:

an oven; and an first group and a second group of horizontally spaced rollers, each roller having a cylindrical surface and a rotational axis, the rollers of the first and second groups horizontally offset from one another and vertically offset so as overlap a horizontal plane such that rollers from the upper and lower groups alternate to form a sinusoidal-like transport path through the oven, the cylindrical surfaces of the roller configured to frictionally engage and move the imaging material along the transport path, wherein a distance between the rotational axes of at least a first pair of consecutive rollers is different from a distance between the rotational axes of at least a second pair of consecutive rollers, the distances being measured relative to a line perpendicular to the rotational axes and parallel with the horizontal plane.

13. The processor of claim 12, wherein an outer diameter of each roller is substantially equal.

14. The processor of claim 12, wherein the cylindrical surface of each roller has an initial contact point and a final contact point with the imaging material as the imaging material moves along the transport path.

15. The thermal processor of claim 14, wherein a distance between a last point of contact and a first point of contact of any two consecutive rollers along the transport path ranges from 10 millimeters to 20 millimeters.

16. The processor of claim 14, wherein the a first spacing between the rotational axes of a first pair of consecutive rollers being the first consecutive pair of rollers to contact the imaging material as it moves along the transport path is different from a second spacing between the rotational axes of a second pair of consecutive rollers being the second pair of consecutive rollers to contact that imaging material as it moves along the transport path such that a first distance between a final contact point and an initial contact point of the first pair of consecutive rollers is different from a second distance between a final contact point and an initial contact point of the second pair of consecutive rollers, and wherein a third spacing between the rotational axes of each remaining pair of consecutive rollers is different from the first spacing and the second spacing such that a third distance between a final contact point and an initial contact point between each remaining pair of consecutive rollers is different from the first distance and the second distance.

17. The processor of claim 16, wherein the second distance is greater than the third distance and the third distance is greater than the first distance.

18. The processor of claim 16, wherein the first spacing is substantially equal to a distance of 11 millimeters, the second spacing is substantially equal to a distance of 18 millimeters, and the third spacing is substantially equal to a distance of 16 millimeters.

19. The processor of claim 14, wherein a distance that each of the rollers overlap the horizontal plane is varied to adjust the initial and final contact points between consecutive rollers along the transport path.

20. The processor of claim 14, wherein a diameter of each of the rollers is varied to adjust the initial and final contact points between consecutive rollers along the transport path.

21. The processor of claim 12, wherein the first and second groups of rollers are vertically spaced, vertically offset, and horizontally offset so as to overlap a vertical plane such that the rollers from the first and second groups alternate to from a sinusoidal-like transport path through the oven.

22. A flatbed thermal processor for thermally developing an imaging material, the processor comprising:

a preheat chamber configured to heat the imaging material to a first temperature, including a first plurality of rollers positioned to form a first portion of a transport path and configured to move the imaging material through the preheat chamber along the first portion of the transport path, each roller having an initial and a final contact point with the imaging material as the imaging material moves along the transport path, wherein a spacing between the rollers is varied such that a distance between a final contact point and an initial contact point of at least a first pair of consecutive rollers along the first potion of the transport path is different from a distance between a final contact point and an initial contact point of at least a second pair of consecutive rollers along the first portion of the transport path; and a dwell chamber configured to heat the imaging material to a second temperature greater than the first temperature, including a second plurality of rollers positioned to form a second portion of the transport path and configured to move the imaging material through the dwell chamber along the second portion of the transport path, each roller having an initial and a final contact point with the imaging material as the imaging material moves along the transport path, wherein a spacing between the rollers is varied such that a distance between a final contact point and an initial contact point of at least a first pair of consecutive rollers along the second potion of the transport path is different from a distance between a final contact point and an initial contact point of at least a second pair of consecutive rollers along the second portion of the transport path.

23. A method of operating a thermal processor for thermally developing an image in an imaging material, the method comprising:

positioning a plurality of rollers so as to form a transport path through the thermal processor;

moving the imaging material along the transport path through contact with the rollers, each roller having an initial and a final contact point with the imaging material as the imaging material moves along the transport path; and varying a spacing between the rollers such that a distance between a final contact point and an initial contact point of at least a first pair of consecutive rollers along the transport path is different from a distance between a final contact point and an initial contact point of at least a second pair of consecutive rollers along the transport path.

24. The method of claim 23, wherein varying a spacing between the rollers comprises varying the spacing between each pair of consecutive rollers such that a distance between a final contact point and an initial contact point of any pair of consecutive rollers along the transport path is different from a distance between a final contact point and an initial contact point of any other pair of consecutive rollers along the transport path.

25. The method of claim 23, wherein varying a spacing between the rollers comprises varying the spacing between the rollers such that a distance between a final contact point and an initial contact point of any two rollers along the transport path is different from a distance between a final contact point and an initial contact point of any other two rollers along the transport path.

26. A thermal processor for thermally developing an image in an imaging material, the thermal processor comprising:

means for transporting the imaging material through the thermal processor, the means comprising a plurality of rollers positioned so as to form a transport path through the thermal processor, and through contact with the imaging material configured to move the imaging material along the transport path, each roller having an initial contact point and a final contact point with the imaging material as the imaging material moves along the transport path; and means for varying a spacing between the rollers such that a distance between a final contact point and an initial contact point of at least a first pair of consecutive rollers along the transport path is different from a distance between a final contact point and an initial contact point of at least a second pair of consecutive rollers along the transport path.

27. The processor of claim 26, wherein the means for varying a spacing between the rollers includes means for varying the spacing between each pair of consecutive rollers such that a distance between a final contact point and an initial contact point of any pair of consecutive rollers along the transport path is different from a distance between a final contact point and an initial contact point of any other pair of consecutive rollers along the transport path.

28. The processor of claim 26, wherein the means for varying a spacing between the rollers includes means for varying the positioning of the rollers in a dimension generally parallel to the transport path.

29. The processor of claim 26, wherein the means for varying a spacing between the rollers includes means for varying the positioning of the rollers in a dimension generally perpendicular to the transport path.

* * * * *